US008095675B2

(12) United States Patent
Tripathi et al.

(10) Patent No.: US 8,095,675 B2
(45) Date of Patent: Jan. 10, 2012

(54) PRIORITY AND BANDWIDTH SPECIFICATION AT MOUNT TIME OF NAS DEVICE VOLUME

(75) Inventors: Sunay Tripathi, San Jose, CA (US); Brian L. Wong, Midlothian, VA (US); Richard A. McNeal, Boulder, CO (US)

(73) Assignee: Oracle America, Inc., Redwood City, CA (US)

( * ) Notice: Subject to any disclaimer, the term of this patent is extended or adjusted under 35 U.S.C. 154(b) by 1265 days.

(21) Appl. No.: 11/489,934

(22) Filed: Jul. 20, 2006

(65) Prior Publication Data

US 2008/0046610 A1    Feb. 21, 2008

(51) Int. Cl.
    *G06F 15/16* (2006.01)
(52) U.S. Cl. .......................... 709/230; 709/203
(58) Field of Classification Search .................. 709/203, 709/208–220, 223–230; 710/36; 370/395.42, 370/468
    See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,795,928 B2 * | 9/2004 | Bradley et al. ................. 713/320 |
| 6,831,893 B1 * | 12/2004 | Ben Nun et al. .............. 370/235 |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 7,490,074 B1 * | 2/2009 | Leonard et al. ........................ 1/1 |
| 7,562,250 B2 * | 7/2009 | Wahl et al. .................... 714/6.31 |
| 2002/0188733 A1 * | 12/2002 | Collins et al. ................. 709/229 |
| 2003/0037154 A1 | 2/2003 | Poggio et al. | |
| 2004/0010788 A1 * | 1/2004 | Cota-Robles et al. ............ 718/1 |
| 2004/0044643 A1 * | 3/2004 | deVries et al. ..................... 707/1 |
| 2004/0267866 A1 | 12/2004 | Carollo et al. | |
| 2005/0086659 A1 * | 4/2005 | Huras et al. ................... 718/104 |
| 2005/0111455 A1 | 5/2005 | Nozue et al. | |
| 2005/0135243 A1 | 6/2005 | Lee et al. | |
| 2005/0138620 A1 * | 6/2005 | Lewites ............................ 718/1 |
| 2006/0041667 A1 * | 2/2006 | Ahn et al. ..................... 709/229 |
| 2006/0045089 A1 | 3/2006 | Bacher et al. | |
| 2006/0070066 A1 * | 3/2006 | Grobman ......................... 718/1 |

(Continued)

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

(Continued)

*Primary Examiner* — Asad M Nawaz
*Assistant Examiner* — Sargon Nano

(57) ABSTRACT

A method for specifying input/output (I/O) settings for a virtual machine that includes specifying a bandwidth for the virtual machine, specifying a priority for the virtual machine, sending a mount request for a volume on a network attached storage (NAS) device by the virtual machine, where the bandwidth and priority are transmitted to the NAS device as part of the mount request, and receiving a mount handle by the virtual machine, where the mount handle is associated with the volume.

18 Claims, 3 Drawing Sheets

U.S. PATENT DOCUMENTS

| | | | |
|---|---|---|---|
| 2006/0174324 A1* | 8/2006 | Zur et al. | 726/3 |
| 2006/0294412 A1* | 12/2006 | Ahmadian et al. | 714/4 |
| 2008/0114936 A1* | 5/2008 | Desai | 711/115 |
| 2008/0147956 A1* | 6/2008 | Rawson | 711/6 |
| 2011/0047195 A1* | 2/2011 | Le et al. | 707/827 |

OTHER PUBLICATIONS

"Solaris Networking—The Magic Revealed (Part I)"; Sunay Tripathi's Solaris Networking Weblog; Nov. 14, 2005, pp. 1-22 (22 pages).

* cited by examiner

PRIORITY AND BANDWIDTH SPECIFICATION AT MOUNT TIME OF NAS DEVICE VOLUME

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; SUN061039); "Serialization Queue Framework for Transmitting Packets" with U.S. application Ser. No. 11/479,143.

The present application contains subject matter that may be related to the subject matter in the following U.S. applications filed on Jul. 20, 2006, and assigned to the assignee of the present application: "Low Impact Network Debugging" with U.S. application Ser. No. 11/489,926; "Reflecting Bandwidth and Priority in Network Attached Storage I/O" with U.S. application Ser. No. 11/489,936; "Notifying Network Applications of Receive Overflow Conditions" with U.S. application Ser. No. 11/490,821; "Host Operating System Bypass for Packets Destined for a Virtual Machine" with U.S. application Ser. No. 11/489,943; "Multi-Level Packet Classification" with U.S. application Ser. No. 11/490,745; "Method and System for Automatically Reflecting Hardware Resource Allocation Modifications" with U.S. application Ser. No. 11/490,582; "Multiple Virtual Network Stack Instances Using Virtual Network Interface Cards" with U.S. application Ser. No. 11/489,942; "Method and System for Network Configuration for Containers" with U.S. application Ser. No. 11/490,479; "Network Memory Pools for Packet Destinations and Virtual Machines" with U.S. application Ser. No. 11/490,486; "Method and System for Network Configuration for Virtual Machines" with U.S. application Ser. No. 11/489,923; "Multiple Virtual Network Stack Instances" with U.S. application Ser. No. 11/489,929; and "Shared and Separate Network Stack Instances" with U.S. application Ser. No. 11/489,933.

BACKGROUND

Network traffic is transmitted over a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are forwarded to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for specifying input/output (I/O) settings for a virtual machine. The method comprises specifying a bandwidth for the virtual machine, specifying a priority for the virtual machine, sending a mount request for a volume on a network attached storage (NAS) device by the virtual machine, wherein the bandwidth and priority are transmitted to the NAS device as part of the mount request, and receiving a mount handle by the virtual machine, wherein the mount handle is associated with the volume.

In general, in one aspect, the invention relates to a system for specifying input/output (I/O) settings for a virtual machine. The system comprises a host comprising the virtual machine, wherein the host is configured to specify a bandwidth for the virtual machine, specify a priority for the virtual machine, send a mount request, by the virtual machine, for a volume on a network attached storage (NAS) device, wherein the bandwidth and priority are transmitted to the NAS device as part of the mount request, transmit the bandwidth and the priority to the NAS device, and receive a mount handle associated with the volume by the virtual machine.

In general, in one aspect, the invention relates to a computer usable medium having computer readable program code embodied therein for causing a computer system to execute a method for specifying input/output (I/O) settings for a virtual machine. The method comprises specifying a bandwidth for the virtual machine, specifying a priority for the virtual machine, sending a mount request, by the virtual machine, for a volume on a network attached storage (NAS) device, wherein the bandwidth and priority are transmitted to the NAS device as part of the mount request, and receiving a mount handle by the virtual machine, wherein the mount handle is associated with the volume.

Other aspects of the invention will be apparent from the following description and the appended claims.

DETAILED DESCRIPTION

Figure 1:
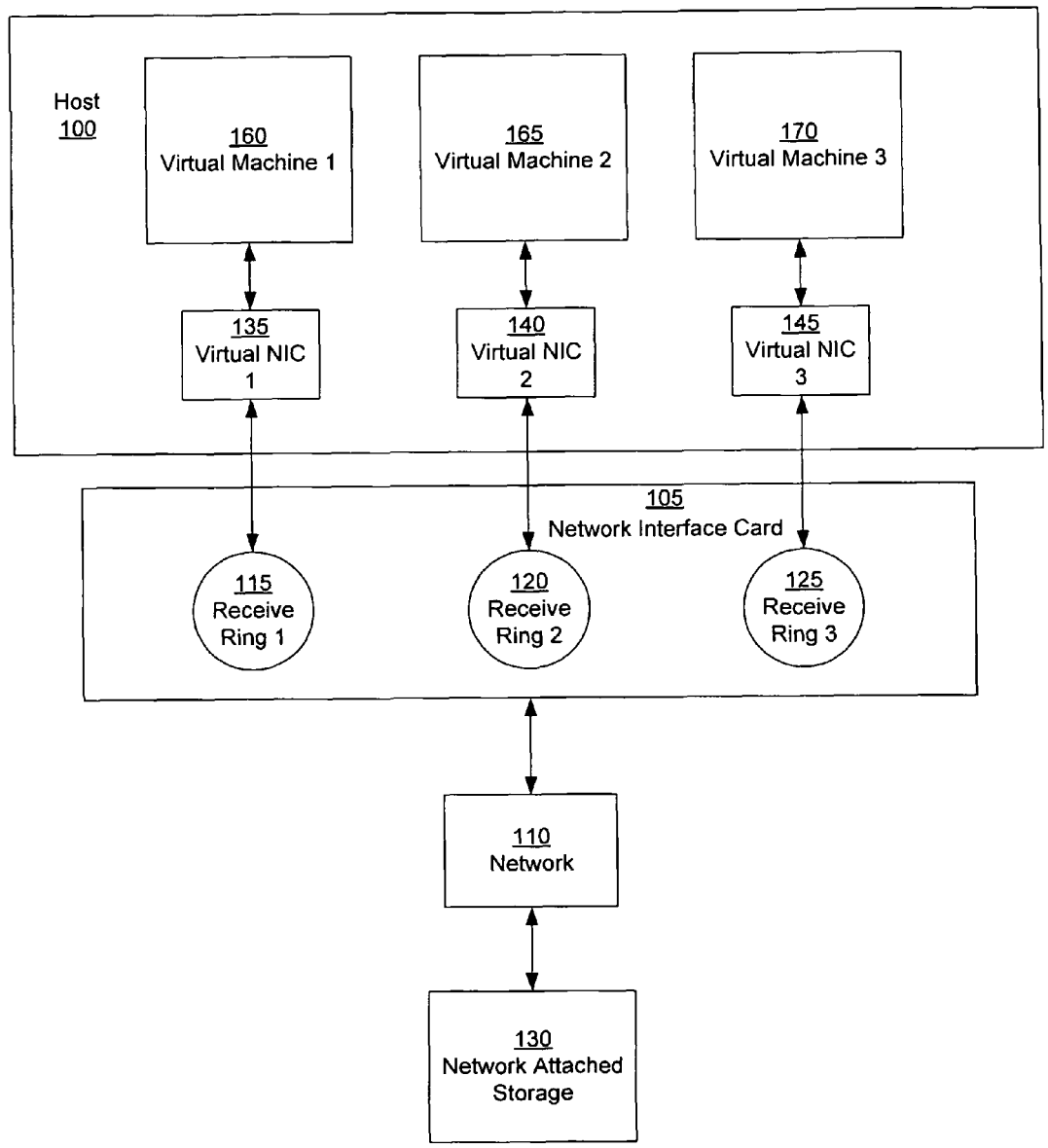
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to specify bandwidth and priority of input/output (I/O) requests occurring over a network. Specifically, embodiments of the invention provide a method and apparatus to specify bandwidth and priority of a virtual machine at the mount time of a Network Attached Storage (NAS) device volume on the virtual machine.

Because multiple virtual machines may exist on the same physical host, network resources such as bandwidth, must be allocated among the virtual machines. As a result, each virtual machine is assigned a bandwidth. In addition, one virtual machine may perform more critical functions than another virtual machine and consequently require data more urgently; to address this, each virtual machine is assigned a priority for I/O requests. The I/O requests for a given host (or set of hosts connected to the NAS device) as then processed according to priority. In one embodiment of the invention, when a NAS device volume is mounted on the virtual machine, the bandwidth and priority are sent to the NAS device. In one or more embodiments of the invention, the bandwidth and priority are sent as part of the mount request for the volume on the NAS device in the form of specialized packets.

FIG. 1 shows a schematic diagram of a system in accordance with one or more embodiments of the invention. As shown in FIG. 1, the system includes a host (100), a network interface card (NIC) (105), a network (110), a network attached storage device (130), multiple receive rings (e.g., receive ring 1 (115), receive ring 2 (120), receive ring 3 (125)), multiple virtual NICs (e.g., virtual NIC 1 (135), virtual NIC 2 (140), virtual NIC 3 (145)), and multiple virtual machines (e.g., virtual machine 1 (160), virtual machine 2 (165), virtual machine 3 (170)). Each of these components is described below.

The NIC (105) provides an interface between the host (100) and a network (110) (e.g., a local area network, a wide area network, a wireless network, etc.). More specifically, the NIC (105) includes a network interface (NI) (i.e., the hardware on the NIC used to interface with the network (110)). For example, the NI may correspond to an RJ-45 connector, a wireless antenna, etc. The packets received by the NI are then forwarded to other components on the NIC (105) for processing. In one embodiment of the invention, the NIC (105) includes one or more receive rings (e.g., receive ring 1 (115), receive ring 2 (120), receive ring 3 (125)). In one embodiment of the invention, the receive rings (e.g., receive ring 1 (115), receive ring 2 (120), receive ring 3 (125)) correspond to portions of memory within the NIC (105) used to temporarily store packets received from the network (110).

In one or more embodiments of the invention, the host (100) may include a device driver (not shown) and one or more virtual NICs (e.g., virtual NIC 1 (135), virtual NIC 2 (140), virtual NIC 3 (145)). In one embodiment of the invention, the device driver provides an interface between the receive rings (e.g., receive ring 1 (115), receive ring 2 (120), receive ring 3 (125)) and the host (100). More specifically, the device driver (not shown) exposes the receive rings (e.g., receive ring 1 (115), receive ring 2 (120), receive ring 3 (125)) to the host (100). In one embodiment of the invention, each of the virtual NICs (e.g., virtual NIC 1 (135), virtual NIC 2 (140), virtual NIC 3 (145)) is associated with one or more receive rings (e.g., receive ring 1 (115), receive ring 2 (120), receive ring 3 (125)). In other words, a virtual NIC (e.g., virtual NIC 1 (130), virtual NIC 2 (135), virtual NIC 3 (140)) receives incoming packets from a corresponding receive ring(s) (e.g., receive ring 1 (115), receive ring 2 (120), receive ring 3 (125)). In one or more embodiments of the invention, outgoing packets are sent from a virtual NIC (e.g., virtual NIC 1 (135), virtual NIC 2 (140), virtual NIC 3 (145)) to a corresponding transmit ring (not shown), which temporarily stores the packet before transmitting the packet over the network (110). In one or more embodiments of the invention, receive rings (e.g., virtual NIC 1 (135), virtual NIC 2 (140), virtual NIC 3 (145)) and transmit rings (not shown) are implemented as ring buffers in the NIC (105).

In one or more embodiments of the invention, the virtual NICs (e.g., virtual NIC 1 (135), virtual NIC 2 (140), virtual NIC 3 (145)) are operatively connected to virtual machines (e.g., virtual machine 1 (160), virtual machine 2 (165), virtual machine 3 (170)) via virtual network stacks (not shown). The virtual NICs (e.g., virtual NIC 1 (135), virtual NIC 2 (140), virtual NIC 3 (145)) provide an abstraction layer between the NIC (105) and the virtual machines (e.g., virtual machine 1 (160), virtual machine 2 (165), virtual machine 3 (170)) on the host (100). More specifically, each virtual NIC (e.g., virtual NIC 1 (135), virtual NIC 2 (140), virtual NIC 3 (145)) operates like a NIC (105). For example, in one embodiment of the invention, each virtual NIC (e.g., virtual NIC 1 (135), virtual NIC 2 (140), virtual NIC 3 (145)) is associated with one or more Internet Protocol (IP) addresses, one or more ports, and configured to handle one or more protocol types. Thus, while the host (100) may be operatively connected to a single NIC (105), virtual machines (e.g., virtual machine 1 (160), virtual machine 2 (165), virtual machine 3 (170)) executing on the host (100) operate as if the host (100) is bound to multiple NICs. Further, each virtual machine (e.g., virtual machine 1 (160), virtual machine 2 (165), virtual machine 3 (170)) may have no knowledge of the other virtual machines residing on the host. To each virtual machine (e.g., virtual machine 1 (160), virtual machine 2 (165), virtual machine 3 (170)), the corresponding virtual NIC (e.g., virtual NIC 1 (135), virtual NIC 2 (140), virtual NIC 3 (145)) is indistinguishable from a physical NIC (105). Further, each virtual NIC (e.g., virtual NIC 1 (135), virtual NIC 2 (140), virtual NIC 3 (145)) includes properties of a physical NIC, such as link speed, Media Access Control (MAC) address, etc.

In one embodiment of the invention, each virtual machine (e.g., virtual machine 1 (160), virtual machine 2 (165), virtual machine 3 (170)) includes a virtual network stack. Each virtual network stack includes functionality to process packets in accordance with various protocols used to send and receive packets (e.g., Transmission Communication Protocol (TCP), Internet Protocol (IP), User Datagram Protocol (UDP), etc.). Further, each virtual network stack may also include functionality, as needed, to perform additional processing on the incoming and outgoing packets. This additional processing may include, but is not limited to, cryptographic processing, firewall routing, etc.

In one or more embodiments of the invention, the virtual network stacks correspond to network stacks with network layer and transport layer functionality. In one embodiment of the invention, network layer functionality corresponds to functionality to manage packet addressing and delivery on a network (e.g., functionality to support Internet Protocol, Address Resolution Protocol (ARP), Internet Control Message Protocol (ICMP), etc.). In one embodiment of the invention, transport layer functionality corresponds to functionality to manage the transfer of packets on the network (e.g., functionality to support TCP, UDP, Stream Control Transmission Protocol (SCTP), etc.).

As shown in FIG. 1, the host (100) is connected to a network attached storage (NAS) device (130) through the network (110). In one or more embodiments of the invention, the NAS device (130) acts as a logical file system for the virtual machines (e.g., virtual machine 1 (160), virtual machine 2 (165), virtual machine 3 (170)) on the host (100). Though not shown in FIG. 1, the NAS device (130) may include physical disks (i.e., disks upon which the volume associated with the virtual machines are located) or may be operatively connected to a physical disk, I/O requests from the virtual machines (e.g., virtual machine 1 (160), virtual machine 2 (165), virtual machine 3 (170)) are sent to the NAS device (130) using a series of packets, which are processed by the NAS device. Data is also sent back to the virtual machines (e.g., virtual machine 1 (160), virtual machine 2 (165), virtual machine 3 (170)) from the NAS device (130) in the form of packets.

In one or more embodiments of the invention, each virtual machine (e.g., virtual machine 1 (160), virtual machine 2 (165), virtual machine 3 (170)) is associated with a priority and a bandwidth. The priority and bandwidth denote the priority and bandwidth at which the NAS device processes I/O requests, where the priority and bandwidth are associated with the virtual machine from which the I/O request is issued.

For example, referring to FIG. 1, virtual machine 1 (160) may have a bandwidth of 1 megabyte per second and a priority of "low," virtual machine (165) may have a bandwidth of 10 megabytes per second and a priority of "medium," and virtual machine 3 (170) may have a bandwidth of one gigabyte per second and a priority of "high." An I/O request from virtual machine 3 (170) would therefore be processed before an I/O request from virtual machine 1 (160). Further, an I/O request from virtual machine 3 (170) would be processed more quickly than an I/O request from virtual machine 1 (160) because virtual machine 3 (170) is allocated more bandwidth than virtual machine 1 (160). Those skilled in the art will appreciate that the aforementioned priorities are relative to each other.

Those skilled in the art will appreciate that the bandwidths for the virtual machines are portions of the network (110) bandwidth coming through the NIC (105). Further, those skilled in the art will appreciate that the network (110) bandwidth does not need to be completely divided up among the virtual machines; for example, the three machines could share 50% of the network bandwidth, whereas the other 50% of the network bandwidth is left unallocated.

In one or more embodiments of the invention, the priority and bandwidth are specified at the mount time of a volume on the NAS device (130). In one or more embodiments of the invention, each virtual machine (e.g., virtual machine 1 (160), virtual machine 2 (165), virtual machine 3 (170)) is associated with a volume (not shown) located on the NAS device (140). At the mount time of the volume, the bandwidth and priority of the associated virtual machine are transmitted to the NAS device (130) using specialized packets containing protocol extension headers or vendor specific fields. In one or more embodiments of the invention, the bandwidth and priority for the virtual machine (e.g., virtual machine 1 (160), virtual machine 2 (165), virtual machine 3 (170)) are transmitted as part of the mount request for the volume. Once the NAS device (130) receives the bandwidth and priority of the virtual machine (e.g., virtual machine 1 (160), virtual machine 2 (165), virtual machine 3 (170)), the NAS device (130) stores the bandwidth and priority of that virtual machine in an internal data structure.

In one or more embodiments of the invention, I/O requests from a virtual machine (e.g., virtual machine 1 (160), virtual machine 2 (165), virtual machine 3 (170)) are received by the NAS device (130), where they are processed according to the associated priority and bandwidth. Data sent back to each virtual machine (e.g., virtual machine 1 (160), virtual machine 2 (165), virtual machine 3 (170)) is also transmitted at the bandwidth of the virtual machine to prevent overloading of the virtual machine or dropped packets. In addition, updates in priority and bandwidth for a virtual machine (e.g., virtual machine 1 (160), virtual machine 2 (165), virtual machine 3 (170)) are also sent to the NAS device (130) in the form of specialized packets; once the NAS device (130) receives a priority and/or bandwidth update for a particular virtual machine, the NAS device (130) updates the relevant data structures stored internally and processes I/O requests from that virtual machine at the new bandwidth and/or priority.

Figure 2:
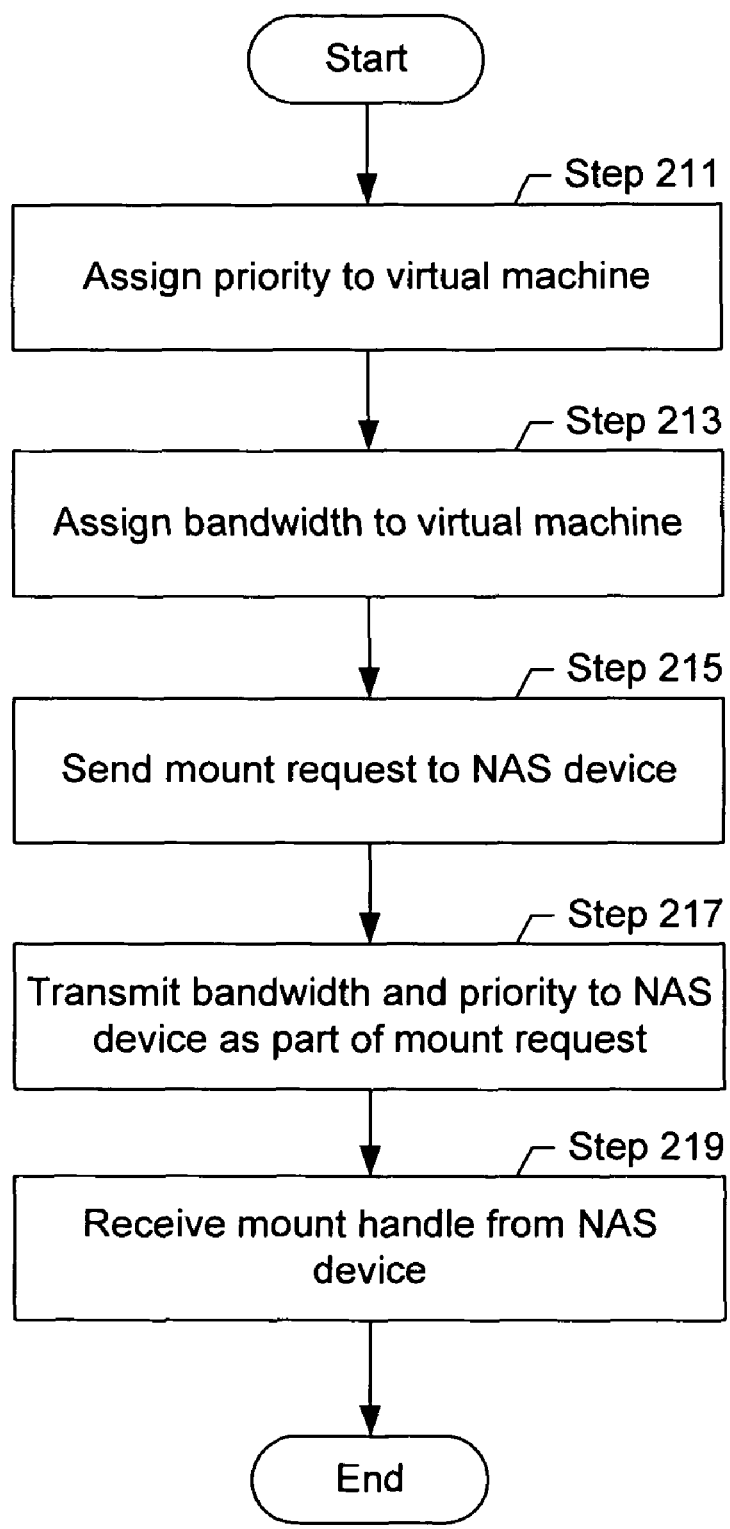
FIG. 2 shows a flow diagram in accordance with one or more embodiments of the invention.

FIG. 2 shows a flow diagram in accordance with one or more embodiments of the invention. Initially, priority (Step 211) and bandwidth (Step 213) are specified for the virtual machine. Next, a mount request is sent to the NAS device for a volume corresponding to the virtual machine (Step 215). In one or more embodiments of the invention, mounting the virtual machine volume involves sending a mount request to the NAS device and receiving the mount handle of the directory associated with the virtual machine volume. For example, a mount request may involve inputting the following characters at a command line interface corresponding to the virtual machine:

mount -t nfs nfs_server:/home /home -o -b 1g -p high

The command mounts the home directory of nfs_server using the Network File System (NFS) protocol, and also specifies options using the -o argument. In one or more embodiments of the invention, the -b argument corresponds to a bandwidth specification; the above example specifies a bandwidth of one gigabyte. In one or more embodiments of the invention, the -p argument corresponds to a priority specification; the above example indicates a high priority for the virtual machine. Alternatively, the bandwidth and priority of the virtual machine may be stored in configuration files associated with the virtual machine and automatically transmitted with the mount request to the NAS device so the NAS device knows how to process I/O requests from the virtual machine.

In one or more embodiments of the invention, the bandwidth and priority of the virtual machine are transmitted as part of the mount request for the virtual machine volume (Step 217). As stated above, the priority and bandwidth are transmitted using protocol extension headers or vendor specific fields in the packets. For example, the bandwidth and priority may be represented using a protocol extension header for NFS, or using vender specific fields in the Internet Small Computer System Interface (iSCSI) standard. Finally, the virtual machine receives a mount handle from the NAS device (Step 219) corresponding to the virtual machine volume, and the volume is mounted. In one or more embodiments of the invention, the priority and bandwidth for the virtual machine are stored on the NAS device when the NAS device receives the mount request. Because priority and bandwidth are stored on the NAS device, I/O requests from the virtual machine can be identified and processed using the priority and bandwidth. Similarly, data packets from the NAS device to the virtual machine are sent at the bandwidth of the virtual machine to avoid dropped packets and other issues.

As mentioned above, updates to the virtual machine's priority and/or bandwidth are also transmitted to the NAS device. Like the original bandwidth and priority specifications, these updates may be transmitted using protocol extension headers or vendor specific fields in a series of specialized packets. In one or more embodiments of the invention, a bandwidth and/or priority update that occurs on the virtual machine is automatically sent to the NAS device so that the updated values can be stored on the NAS device and subsequent I/O requests from the virtual machine can be processed at the right bandwidth and priority.

Figure 3:
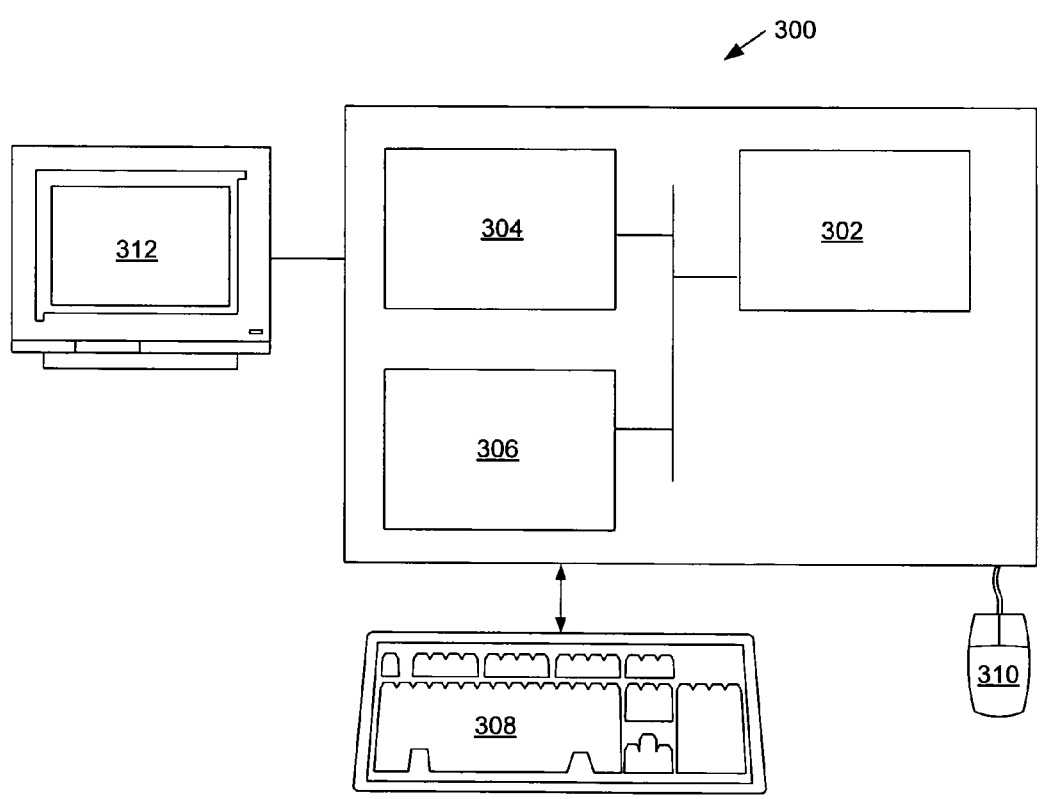
FIG. 3 shows a computer system in accordance with one embodiment of the invention.

The invention may be implemented on virtually any type of computer regardless of the platform being used. For example, as shown in FIG. 3, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of the invention (e.g., NAS device, host, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for specifying input/output (I/O) settings for a virtual machine, comprising:
    assigning a bandwidth for the virtual machine,
        wherein the virtual machine is executing on a host computer, and
        wherein the host computer is connected to a network attached storage (NAS) device over a network;
    assigning a priority for the virtual machine;

sending a mount request, by the virtual machine, for a volume on the NAS device by the virtual machine over the network,
    wherein the bandwidth and priority are transmitted to the NAS device as part of the mount request,
    wherein the NAS device stores the bandwidth and priority in response to the mount request,
    wherein the NAS device is a logical file system for the virtual machine when the volume is mounted in response to the mount request, and
    wherein the mount request is sent using the Network File System (NFS) protocol, and wherein the bandwidth and the priority are transmitted in a NFS protocol extension header as part of the mount request; and
receiving a mount handle by the virtual machine, wherein the mount handle is associated with the volume.

2. The method of claim 1, further comprising:
changing the bandwidth associated with the virtual machine to obtain a changed bandwidth; and
sending the changed bandwidth to the NAS device.

3. The method of claim 1, further comprising:
changing the priority associated with the virtual machine to obtain a changed priority; and
sending the changed priority to the NAS device.

4. The method of claim 1, wherein, upon receiving the mount request, the NAS device-generates the mount handle and sends the mount handle associated with the volume to the virtual machine.

5. The method of claim 1, wherein an I/O request from the virtual machine to the NAS device is processed according to the bandwidth of the virtual machine and the priority of the virtual machine.

6. The method of claim 5, wherein a response to the I/O request from the NAS device to the virtual machine is transmitted at the bandwidth of the virtual machine.

7. A system for specifying input/output (I/O) settings for a virtual machine, comprising:
    a network attached storage (NAS) device;
    a host, connected to the NAS device over a network, comprising:
        the virtual machine
    wherein the host is configured to:
        assign a bandwidth for the virtual machine;
        assign a priority for the virtual machine;
        send a mount request over the network, by the virtual machine, for a volume on the NAS device,
            wherein the bandwidth and priority are transmitted to the NAS device as part of the mount request,
            wherein the NAS device stores the bandwidth and priority in response to the mount request,
            wherein the NAS device is a logical file system for the virtual machine when the volume is mounted in response to the mount request, and
            wherein the mount request is sent using the Network File System (NFS) protocol, and wherein the bandwidth and the priority are transmitted in a NFS protocol extension header as part of the mount request; and
        receive a mount handle associated with the volume by the virtual machine.

8. The system of claim 7, wherein, upon receiving the mount request, the NAS device generates the mount handle and sends the mount handle associated with the volume to the virtual machine.

9. The system of claim 7, wherein an I/O request from the virtual machine to the NAS device is processed according to the bandwidth of the virtual machine and the priority of the virtual machine.

10. The system of claim 9, wherein a response to the I/O request from the NAS device to the virtual machine is transmitted at the bandwidth of the virtual machine.

11. The system of claim 7, wherein an update for the bandwidth of the virtual machine is transmitted to the NAS device.

12. The system of claim 7, wherein an update for the priority of the virtual machine is transmitted to the NAS device.

13. A non-transitory computer readable medium having computer readable program code embodied therein for causing a computer system to execute a method for specifying input/output (I/O) settings for a virtual machine, comprising:
    assigning a bandwidth for the virtual machine,
        wherein the virtual machine is executing on a host computer, and
        wherein the host computer is connected to a network attached storage (NAS) device over a network;
    assigning a priority for the virtual machine;
    sending a mount request, by the virtual machine, for a volume on the NAS device over the network,
        wherein the bandwidth and priority are transmitted to the NAS device as part of the mount request,
        wherein the NAS device stores the bandwidth and priority in response to the mount request,
        wherein the mount request is sent using the Network File System (NFS) protocol, and wherein the bandwidth and the priority are transmitted in a NFS protocol extension header as part of the mount request, and
        wherein the NAS device is a logical file system for the virtual machine when the volume is mounted in response to the mount request; and
    receiving a mount handle by the virtual machine, wherein the mount handle is associated with the volume.

14. The non-transitory computer readable medium of claim 13, further comprising:
changing the bandwidth associated with the virtual machine to obtain a changed bandwidth; and sending the changed bandwidth to the NAS device.

15. The non-transitory computer readable medium of claim 13, further comprising:
changing the priority associated with the virtual machine to obtain a changed priority; and
sending the changed priority to the NAS device.

16. The non-transitory computer readable medium of claim 13, wherein, upon receiving the mount request, the NAS device generates the mount handle and sends the mount handle associated with the volume to the virtual machine.

17. The non-transitory computer readable medium of claim 13, wherein an I/O request from the virtual machine to the NAS device is processed according to the bandwidth of the virtual machine and the priority of the virtual machine.

18. The non-transitory computer readable medium of claim 17, wherein a response to the I/O request from the NAS device to the virtual machine is transmitted at the bandwidth of the virtual machine.

* * * * *